(12) United States Patent
Sato et al.

(10) Patent No.: US 10,367,995 B2
(45) Date of Patent: *Jul. 30, 2019

(54) IMAGING APPARATUS HAVING CONTROL CIRCUIT THAT CORRESPONDS A REGION OF FIRST IMAGE DATA WITH SECOND IMAGE DATA

(71) Applicant: OLYMPUS CORPORATION, Hachioji-shi, Tokyo (JP)

(72) Inventors: Akinobu Sato, Hachioji (JP); Takashi Suzuki, Hino (JP); Yoichi Yoshida, Inagi (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,111

(22) Filed: Sep. 25, 2018

(65) Prior Publication Data

US 2019/0028638 A1  Jan. 24, 2019

Related U.S. Application Data

(63) Continuation of application No. 15/848,136, filed on Dec. 20, 2017, now Pat. No. 10,116,862, which is a
(Continued)

(30) Foreign Application Priority Data

Jan. 31, 2014 (JP) ................. 2014-017596

(51) Int. Cl.
*H04N 5/232* (2006.01)
*H04N 5/225* (2006.01)

(52) U.S. Cl.
CPC ....... *H04N 5/23222* (2013.01); *H04N 5/2258* (2013.01); *H04N 5/23206* (2013.01)

(58) Field of Classification Search
CPC ............. H04N 5/23222; H04N 5/2258; H04N 5/23206
See application file for complete search history.

(56) References Cited

U.S. PATENT DOCUMENTS 9,894,267 B2 *  2/2018  Sato .............. H04N 5/2258
2002/0019819 A1  2/2002  Sekiguchi
(Continued)

FOREIGN PATENT DOCUMENTS

CN  1331451 A  1/2002
CN  101511004 A  8/2009
(Continued)

OTHER PUBLICATIONS

International Search Report mailed in corresponding International Patent Application No. PCT/JP2014/066970 dated Sep. 30, 2014, consisting of 3 pp.
(Continued)

*Primary Examiner* — Twyler L Haskins
*Assistant Examiner* — Angel L Garces-Rivera
(74) *Attorney, Agent, or Firm* — Volpe and Koenig, P.C.

(57) ABSTRACT

An image generation apparatus and method includes a first imaging circuit that acquires first image data, a second imaging circuit that acquires second image data, a control circuit that searches a region corresponding to the first image data from the second image data, a designating circuit that limits a region in the second image data corresponding to the first image data by a touch operation designating a limited region in the second image data corresponding to the first image data, and a communication circuit that is provided in the second imaging circuit, transmits, upon receipt of an information acquiring operation, information obtained by analyzing the limited region or the corresponding region in the second image data to a server, and receives information relating to the first image data from the server.

11 Claims, 10 Drawing Sheets

Related U.S. Application Data continuation of application No. 14/595,887, which is a continuation of application No. PCT/JP2014/066970, filed on Jun. 26, 2014, now Pat. No. 9,894,267.

(56) References Cited

U.S. PATENT DOCUMENTS

| | | |
|---|---|---|
| 2009/0253374 A1 | 10/2009 | Matsuo |
| 2011/0181779 A1 | 7/2011 | Park |
| 2011/0314049 A1 | 12/2011 | Poirier |
| 2012/0321203 A1 | 12/2012 | Yamashita |
| 2013/0100255 A1 | 4/2013 | Ohba |
| 2013/0258160 A1 | 10/2013 | Yoshioka |
| 2015/0381884 A1 | 12/2015 | Escobedo |

FOREIGN PATENT DOCUMENTS

| | | |
|---|---|---|
| JP | 2002-007432 | 1/2002 |
| JP | 2002-176509 | 6/2002 |
| JP | 2008-152569 | 7/2008 |
| JP | 2010-074638 | 4/2010 |
| JP | 2012-155362 | 8/2012 |
| WO | 2012001755 A1 | 1/2012 |
| WO | 2012090890 A1 | 7/2012 |

OTHER PUBLICATIONS

Office Action issued in corresponding Japanese Patent Application No. 2014-551360 dated Jan. 20, 2015, consisting pf 4 pp (English translation provided).

English Translation of International Search Report mailed in corresponding International Patent Application No. PCT/JP2014/066970 dated Sep. 30, 2014, consisting of 2 pp.

International Preliminary Report on Patentability issued in corresponding International Patent Application No. PCT/JP2014/066970 dated Aug. 2, 2016, consisting of 9 pp.

Office Action issued in corresponding Chinese Patent Application No. 201480002053.5 dated Aug. 2, 2017, consisting of 15 pp.

* cited by examiner

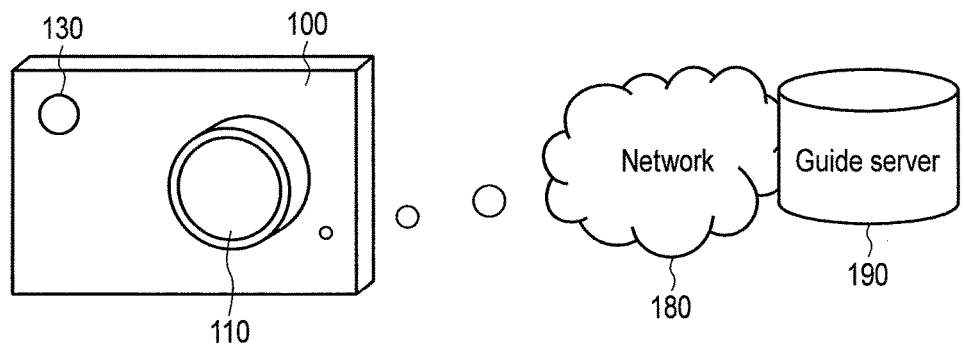
F I G. 1
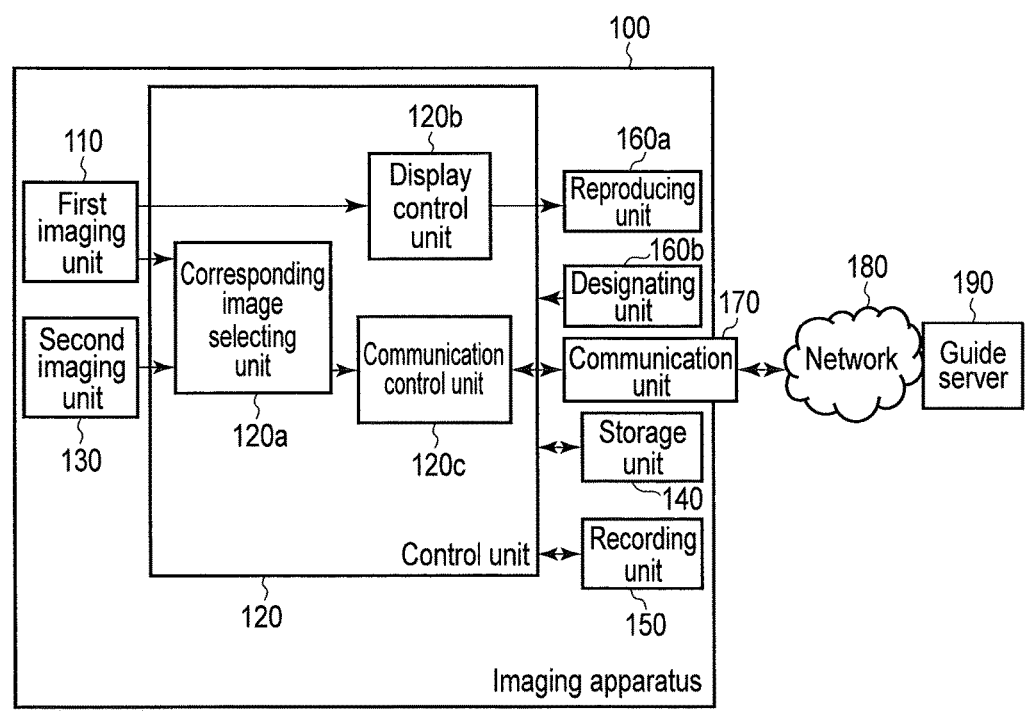
F I G. 2

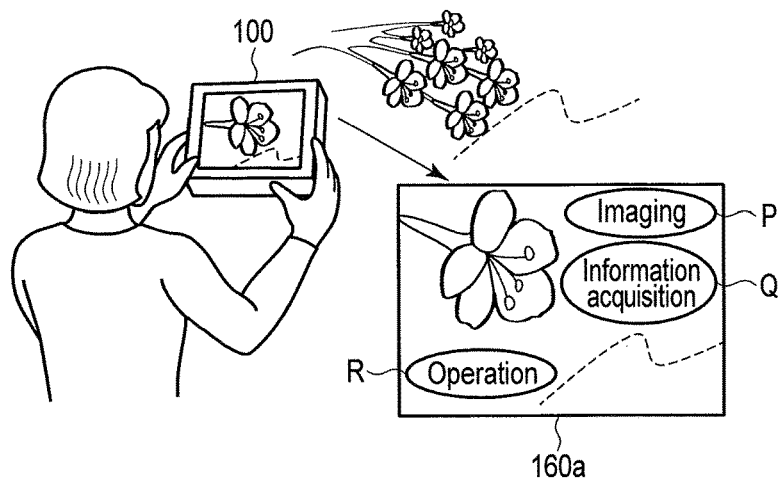
F I G. 3A
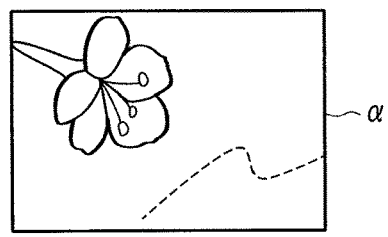
F I G. 3B
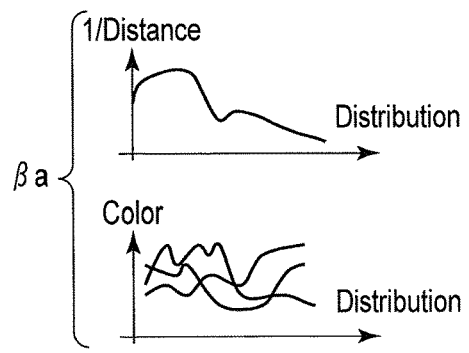
F I G. 3C

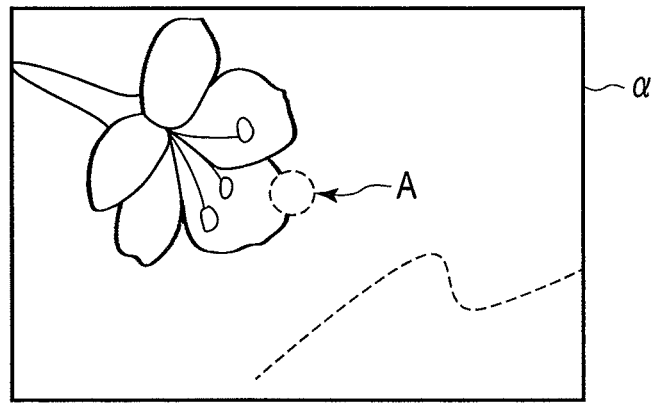
F I G. 5A
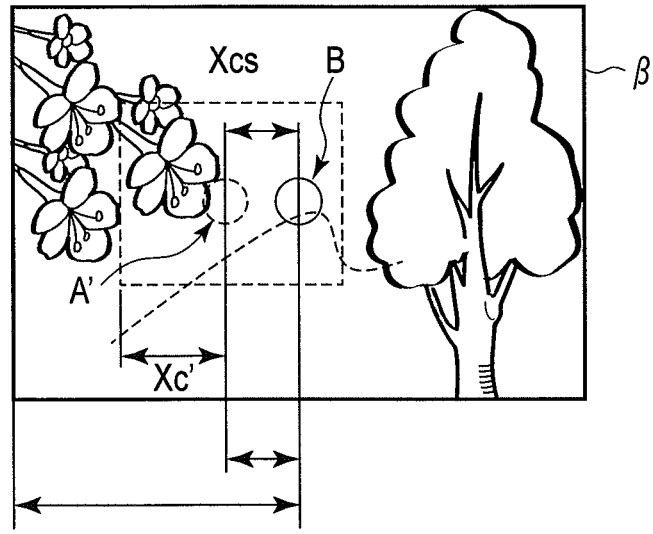
F I G. 5B

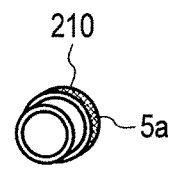
F I G. 7A
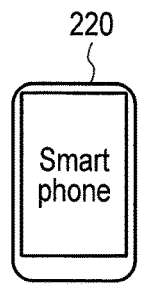
F I G. 7B
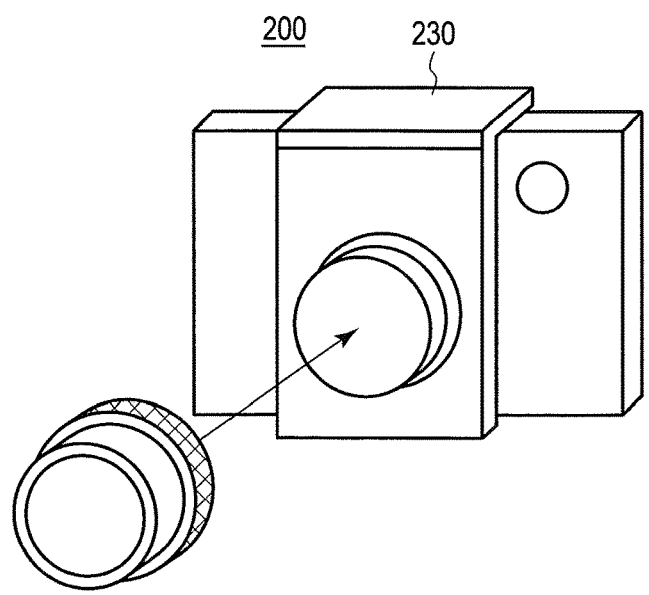
F I G. 7C

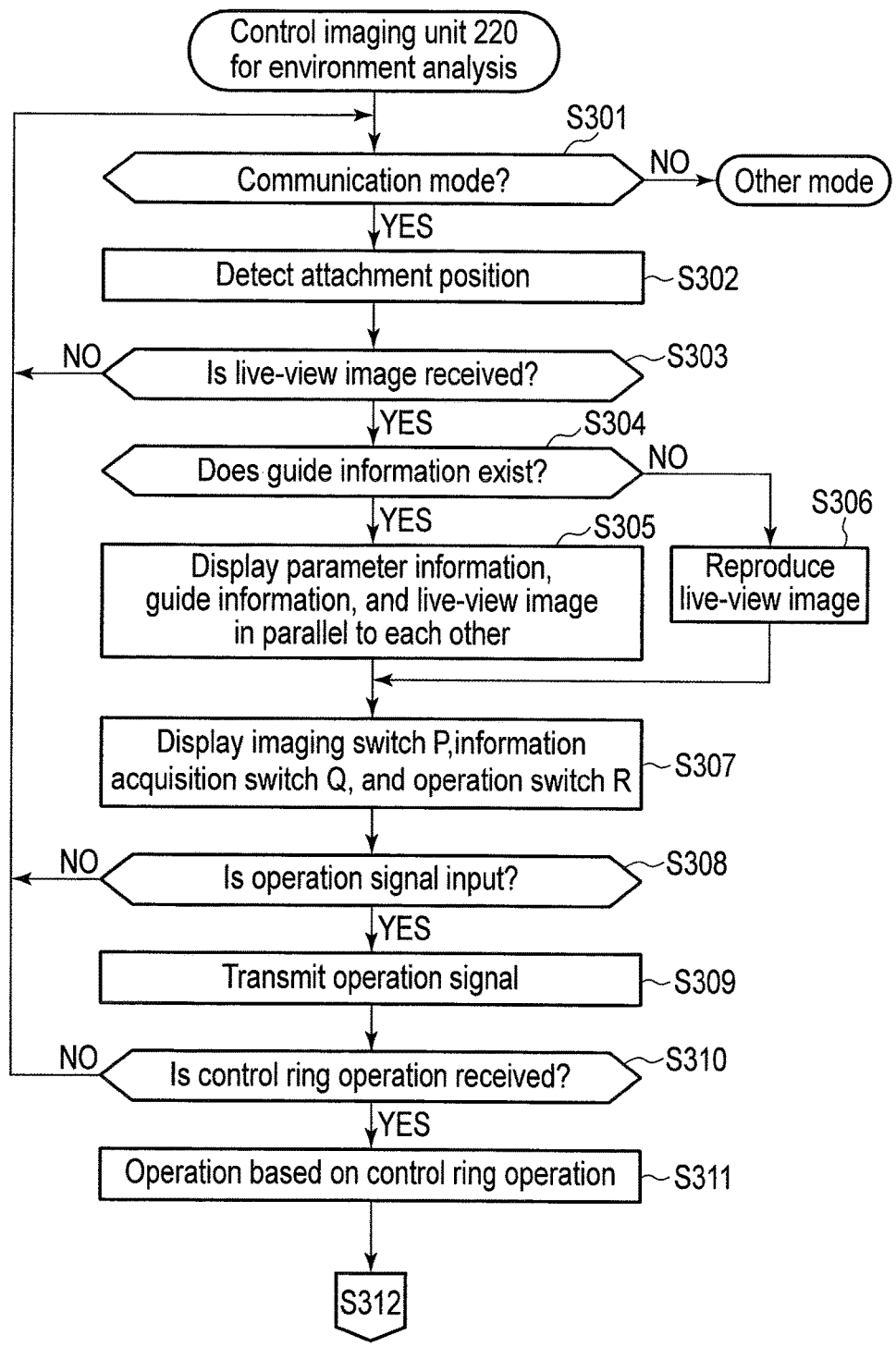
F I G. 10A

IMAGING APPARATUS HAVING CONTROL CIRCUIT THAT CORRESPONDS A REGION OF FIRST IMAGE DATA WITH SECOND IMAGE DATA

CROSS-REFERENCE TO RELATED APPLICATIONS

This application is a Continuation Application of U.S. application Ser. No. 15/848,136, filed Dec. 20, 2017, which is a Continuation Application of U.S. application Ser. No. 14/595,887, filed Jan. 13, 2015, now U.S. Pat. No. 9,894,267, granted on Feb. 13, 2018, which is a Continuation Application of PCT Application No. PCT/JP2014/066970, filed Jun. 26, 2014 and based upon and claiming the benefit of priority from the prior Japanese Patent Application No. 2014-017596, filed Jan. 31, 2014, the entire contents of both of which are incorporated herein by reference.

BACKGROUND OF THE INVENTION

1. Field of the Invention

The present invention relates to an imaging apparatus.

2. Description of the Related Art

A large amount of portable information reading apparatuses such as mobile phones or digital cameras can read an image such as barcode or character information displayed on an image display unit. For example, in Jpn. Pat. Appln. KOKAI Publication No. 2002-176509 and Jpn. Pat. Appln. KOKAI Publication No. 2008-1525692, an apparatus having a function of notifying the case to be a state in which an image can be read has been suggested.

BRIEF SUMMARY OF THE INVENTION

According to an aspect of the invention, there is provide an imaging apparatus comprising: a first imaging unit that acquires first image data; a second imaging unit that acquires second image data including a region corresponding to the first imaging unit; a designating unit that designates a designation region in the first image data; a control unit that searches a region corresponding to the designation region in the second image data; a communication unit that transmits the region corresponding to the designation region in the second image data to a server and receives guide information from the server; and a reproducing unit that associates the first image data with the guide information to reproduce the first image data and the guide information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram of an imaging apparatus according to an embodiment of the present invention;

FIG. 2 is a diagram illustrating a configuration example of the imaging apparatus according to the embodiment of the present invention;

FIG. 3A is a diagram illustrating a use example of the imaging apparatus according to the embodiment;

FIG. 3B is a diagram illustrating first image data acquired by a first imaging unit;

FIG. 3C is a diagram illustrating transmission information;

FIG. 5A is a diagram illustrating a center position in the first image data;

FIG. 5B is a diagram illustrating a region corresponding to the first image data in the second image data;

FIG. 7A is a diagram illustrating an outer appearance of a photo image imaging unit;

FIG. 7B is a diagram illustrating an outer appearance of an imaging unit for an environment analysis;

FIG. 7C is a diagram illustrating the imaging apparatus in a state in which the photo image imaging unit is attached to the imaging unit for the environment analysis;

FIG. 10A is a first diagram illustrating an operation example of the imaging unit for the environment analysis;

DETAILED DESCRIPTION OF THE INVENTION

Figure 4:
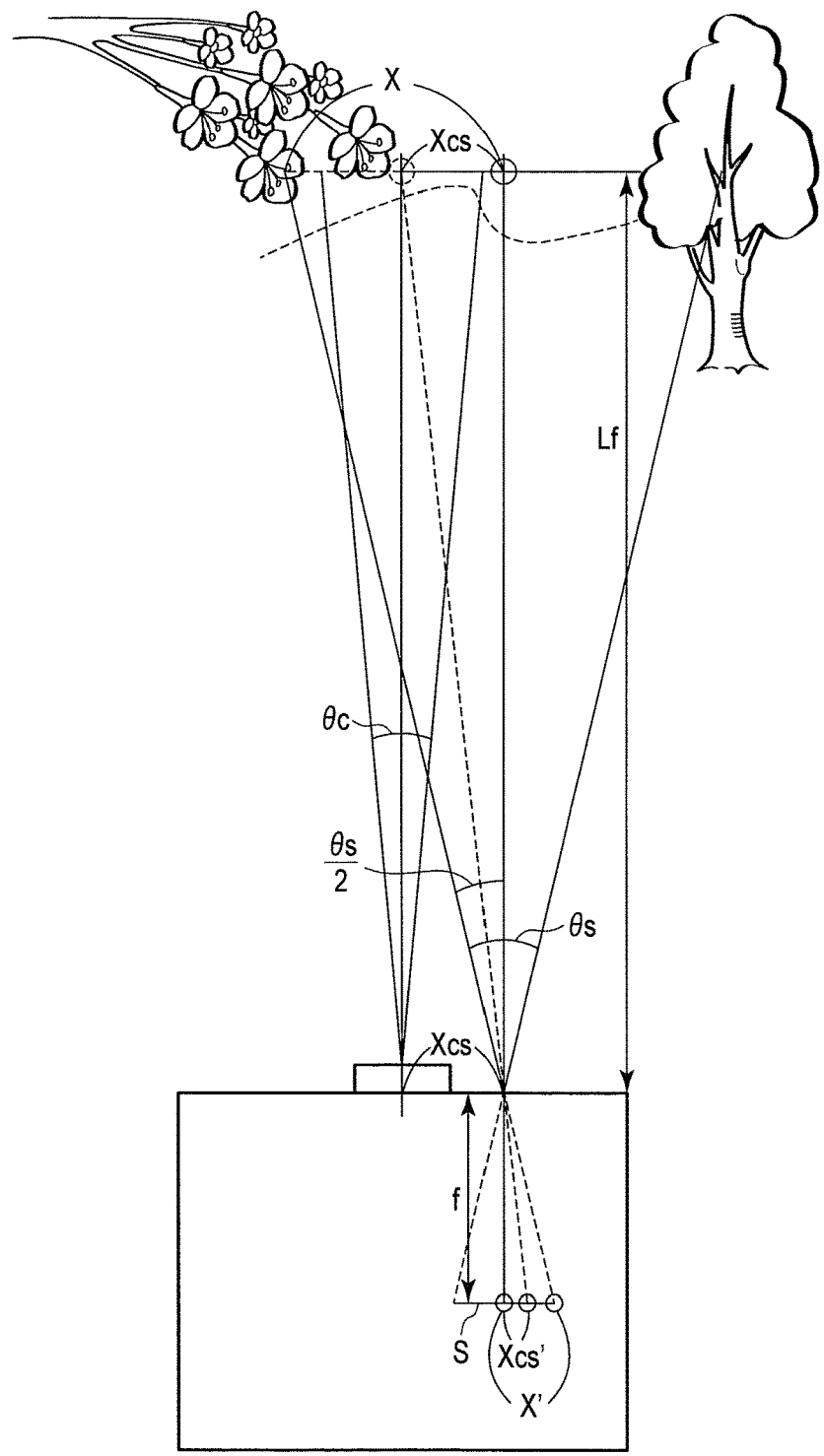
FIG. 4 is a diagram illustrating a calculation example of a position and a size of a viewing angle of a region corresponding to the first image data included in a viewing angle of second image data.

Hereinafter, an imaging apparatus according to an embodiment of the present invention will be described. An imaging apparatus 100 has a first imaging unit 110 and a second imaging unit 130 and is connected to a guide server 190 through a network 180, as illustrated in a schematic diagram of FIG. 1. An optical axis of the first imaging unit 110 and an optical axis of the second imaging unit 130 are configured to be parallel to each other. If a direction and a viewing angle of the imaging apparatus 100 are managed, the optical axes of the first imaging unit 110 and the second imaging unit 130 may not be necessarily parallel to each other.

The imaging apparatus 100 can acquire guide information from the guide server 190. The first imaging unit 110 acquires first image data α (refer to FIG. 5A). The first image data α is image data recorded by a user and is high-definition image data printed, distributed, or enlarged and viewed by the user. Meanwhile, the second imaging unit 130 is an imaging unit having a viewing angle wider than a viewing angle of the first imaging unit 110 and acquires second image data β, (refer to FIG. 5B). The second image data β, is image data including a region corresponding to a region of the first image data α. Therefore, if a region corresponding to the first image data α is extracted from the second image data β, the region may become relatively low pixels. However, the number of the pixels is not so necessary for use other than recording, as described below. In addition, the number of pixels of the second image data β, may be slightly small from the beginning. In addition, each of the first imaging unit 110 and the second imaging unit 130 may have a zoom function. However, in the case in which the imaging apparatus 100 performs a zoom operation on the first imaging unit 110, because the second image data β, has a region in which the region corresponding to the first image data α can be searched, a viewing angle of the second imaging unit 130 is preferably a wide angle, when the first imaging unit 110 and the second imaging unit 130 are used in cooperation with each other. Image data of the corresponding region is transmitted to the guide server 190. The guide server 190 stores guide information. The guide information is a guide of a method of imaging the first image data α or map information to specify a position of a subject, for example.

FIG. 2 illustrates a configuration example of the imaging apparatus 100. The imaging apparatus 100 has the first imaging unit 110, the second imaging unit 130, a control unit 120, a storage unit 140, a recording unit 150, a reproducing unit 160a, a designating unit 160b, and a communication unit 170.

The control unit 120 is a CPU, for example, and has a corresponding image selecting unit 120a, a display control unit 120b, and a communication control unit 120c. The corresponding image selecting unit 120a selects a region corresponding to the first image data α from the region of the second image data β. The display control unit 120b performs control to reproduce an image in the reproducing unit 160a. In addition, the display control unit 120b performs control to reproduce the guide information by the reproducing unit 160a. The communication control unit 120c controls the communication unit 170 to perform control for communication of the imaging apparatus 100 and the guide server 190.

The first imaging unit 110 receives light emitted from a subject not illustrated in the drawings by a light reception surface, forms an image, and generates image data (first image data α) on the basis of the image. The second imaging unit 130 generates the second image data β, similar to the first imaging unit 110.

The storage unit 140 is a DRAM, for example, and temporarily stores the first image data α acquired by the first imaging unit 110 and the second image data β acquired by the second imaging unit 130. The recording unit 150 is a flash memory, for example, and records various data such as the image data or the guide information. The reproducing unit 160a is a liquid crystal display, for example, and reproduces image data.

The designating unit 160b is an input unit of a touch type, for example, and is arranged to be overlapped to the reproducing unit 160a. The designating unit 160b is used for an input of an imaging instruction to execute imaging by the first imaging unit 110, an input of an instruction to designate a region corresponding to the first image data α in the region of the second image data β, and an input of an imaging parameter of each imaging unit, for example. The imaging parameter is an exposure value of the first imaging unit 110, for example. The imaging parameter of the first imaging unit 110 and the imaging parameter of the second imaging unit 130 may be different values, respectively.

FIG. 3A is a diagram illustrating a use example of the imaging apparatus 100. The imaging apparatus 100 displays an imaging switch P, an information acquisition switch Q, and an operation switch R on the reproducing unit 160a, after acquiring the first image data α by the first imaging unit 110 and reproducing the first image data α by the reproducing unit 160a. Each switch may be a mechanical switch. If a touch on each switch displayed on the reproducing unit 160a is detected by the designating unit 160b, an operation corresponding to each switch is executed.

When the touch on the imaging switch P is detected, the imaging apparatus 100 acquires the first image data α by the first imaging unit 110, as illustrated in FIG. 3B.

When the touch on the information acquisition switch Q is detected, the imaging apparatus 100 performs an operation to acquire the guide information from the guide server 190. That is, the imaging apparatus 100 acquires the second image data β by the second imaging unit 130. Then, the imaging apparatus 100 selects information of a region in the second image data β corresponding to the first image data α acquired by the first imaging unit at the time of acquiring the second image data β and transmits the selected information of the region to the guide server 190. Then, the imaging apparatus 100 receives the guide information from the guide server 190 and reproduces the guide information by the reproducing unit 160a. The imaging apparatus 100 may transmit transmission information βa including color information or distance information as the selected information of the region to the guide server 190, as illustrated in FIG. 3C. Image data assuming external communication like the selected region preferably has a small image size to alleviate a load of communication. For this reason, the imaging apparatus 100 may further limit a region used for communication by a touch operation for image specification, such that a specific region is narrowed from the second image data β.

When the touch on the operation switch R is detected, the imaging apparatus 100 operates the imaging parameter of each imaging unit corresponding to the operation switch R.

The user first operates the operation switch R and sets the imaging parameter of each imaging unit. For example, when high-definition image data is acquired, the user operates the imaging switch P. At this time, the imaging apparatus 100 acquires the first image data α. In addition, the user operates the information acquisition switch Q when the user thinks that the user desires to acquire more detailed information of the subject while viewing a reproduction image of the first image data α reproduced in the reproducing unit 160a. At this time, the imaging apparatus 100 reproduces the guide information.

The region corresponding to the first image data α in the second image data β that become a search key of the guide information is searched by performing calculation by the corresponding image selecting unit 120a, for example, as illustrated in FIGS. 4, 5A, and 5B. This searching method is an example. The imaging apparatus 100 may analyze a similarity degree such as a color, a shape, and a feature point of each image data and select the corresponding region from the second image data β.

The calculation is performed for an x-direction to be a horizontal direction of the viewing angle and a y-direction to be a vertical direction of the viewing angle. Because calculation methods of the x-direction and the y-direction are the same, the calculation method for the x-direction will be described and explanation for the y-direction will be omitted in the first embodiment.

An interval of a horizontal direction of the optical axis of the first imaging unit 110 and the optical axis of the second imaging unit 130 is set as Xcs. In addition, a distance from the center of a lens of each imaging unit to the subject is sufficiently long. At this time, distances from the first imaging unit 110 and the second imaging unit 130 to the subject of an optical axis direction are regarded as being substantially equal to each other. The distance is set as Lf. The distance Lf can be detected from a phase difference detected by a phase difference detection pixel, when the second imaging unit 130 is configured to have the phase difference detection pixel. In addition, the distance Lf can be detected from a focusing position of a lens of the second imaging unit 130. In addition, the viewing angle of the second imaging unit 130 is set as θs. At this time, an interval X of a horizontal direction from an end of a horizontal viewing angle of the second imaging unit 130 at the distance Lf to the optical axis of the second imaging unit 130 can be represented as X=Lftan(θs/2).

If the subject separated by the distance Lf is captured at the center of the optical axis of the first imaging unit 110, light emitted from the subject forms an image at a position separated by Xcs' from the center of a light reception surface S of the second imaging unit 130, through a lens of the second imaging unit 130 not illustrated in the drawings. At this time, Xcs' is calculated as Xcs'=(f/Lf)×Xcs. f shows a focal distance of the second imaging unit 130 corresponding to the viewing angle θs. A center position A' of the region corresponding to the first imaging unit 110 included in the viewing angle of the second imaging unit 130 is calculated by Xcs', as illustrated in FIG. 5B. In addition, a half Xc' of the size of the horizontal direction of the first image data α is calculated as Xc'=f tan(θc/2), using the viewing angle θc of the first imaging unit 110.

A position corresponding to a center position A of the first image data α illustrated in FIG. 5A in the x-direction of the second image data β illustrated in FIG. 5B is a position A' shifted from a center position B of the second image data β by Xcs'. In addition, the size of the horizontal direction of the region corresponding to the first image data α in the second image data β is a size increased by Xc' in a leftward-to-rightward direction from the center position A', as illustrated in FIG. 5B.

The same calculation is performed for the y-direction, so that the region corresponding to the first image data α in the second image data β can be searched. The imaging apparatus 100 may use the similarity degree of each image data and the method described using the expression described above together, use either the similarity degree or the method secondarily, or use only one of either the similarity degree or the method. In addition, the imaging apparatus 100 may reflect a touch detection result by the designating unit 160b as a corresponding region.

Figure 6:
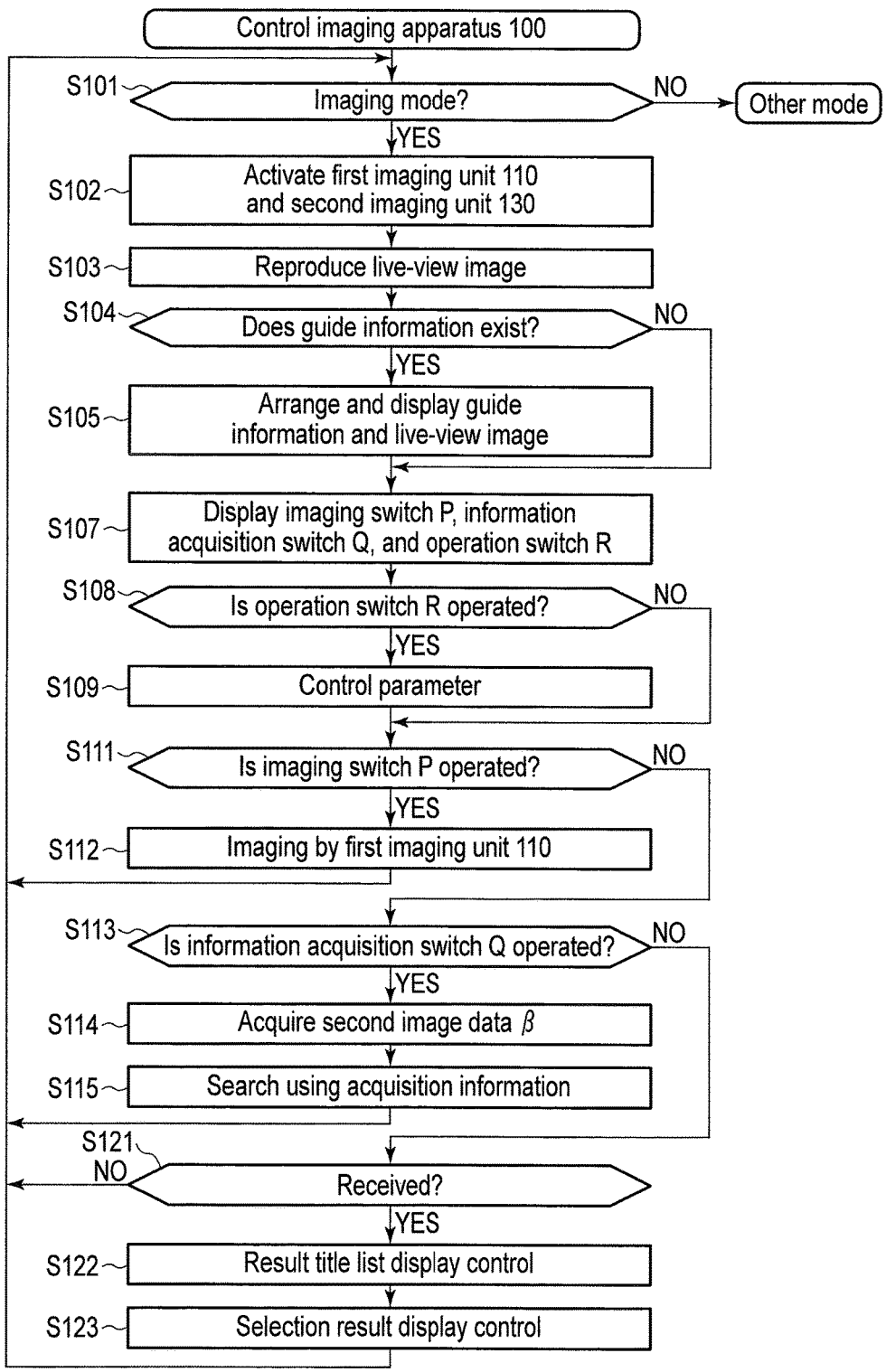
FIG. 6 is a diagram illustrating an operation example of an imaging apparatus according to a first embodiment of the present invention.

An operation example of the imaging apparatus 100 is illustrated in FIG. 6. The control unit 120 activates the imaging apparatus 100 and determines whether an imaging mode is selected (step S101). When it is determined that the imaging mode is not selected (NO in step S101), the control unit 120 selects other mode. Other mode is a reproduction mode, for example. Meanwhile, when it is determined that the imaging mode is selected (YES in step S101), the control unit 120 starts imaging by the first imaging unit 110 and the second imaging unit 130 (step S102). The first image data α acquired by the first imaging unit 110 is temporarily stored in the storage unit 140. Then, the control unit 120 reads the first image data α stored in the storage unit 140 and reproduces the read first image data α as a live-view image by the reproducing unit 160a (step S103).

After step S103, the control unit 120 determines whether guide information corresponding to the reproduced live-view image is recorded in the recording unit 150 (step S104). When it is determined that the guide information is recorded in the recording unit 150 (YES in step S104), the control unit 120 reads the guide information from the recording unit 150 and displays the guide information and the live-view image arranged in parallel on the reproducing unit 160a (step S105).

After the guide information is displayed on the reproducing unit 160a or when it is determined that the guide information is not recorded in the recording unit 150 (NO in step S104), as illustrated in FIG. 3A, the control unit 120 displays the imaging switch P, the information acquisition switch Q, and the operation switch R on the reproducing unit 160a (step S107). Then, the control unit 120 determines whether the touch on the operation switch R is detected (step S108). When it is determined that the touch on the operation switch R is detected (YES in step S108), the control unit 120 changes the imaging parameter corresponding to the operation switch R (step S109). After the imaging parameter is changed or when it is determined that the touch on the operation switch R is not detected, the control unit 120 determines whether the touch on the imaging switch P is detected (step S111). When it is determined that the touch on the imaging switch P is detected (YES in step S111), the control unit 120 acquires the first image data α by the first imaging unit 110 (step S112). Meanwhile, when it is determined that the touch on the imaging switch P is not detected (NO in step S111), the control unit 120 determines whether the touch on the information acquisition switch Q is detected (step S113). When it is determined that the touch on the information acquisition switch Q is detected (YES in step S113), the control unit 120 acquires the second image data β (step S114). Then, the control unit 120 selects the region in the second image data β corresponding to the first image data α and transmits image data of the selected region in the second image data β to the guide server 190 (step S115). The guide server 190 searches the guide information using the received image data. As such, the second image data β has a characteristic different from a characteristic of the first image data α for recording and viewing, to acquire the guide information. The first image data α has information necessary for an expression of emotional beauty such as detail, gradation, and color tone, to be used for viewing the imaged image data. Meanwhile, in the second image data β, contrast or color information is preferably clear with handling easy information. In addition, auxiliary information such as distance information or size information may be preferably added to the second image data β. The imaging apparatus 100 according to this embodiment executes the operation described above, so that the imaging apparatus can simply acquire the second image data β to acquire the guide information. The distance information may be acquired from imaging results by the two imaging units using triangulation or a distance measurement sensor may be embedded in a light reception surface (imaging element) of each imaging unit and the distance information may be acquired using a result of the distance measurement sensor. A size of a target material is determined by the distance with the subject and the viewing angle information.

When it is determined that the touch on the information acquisition switch Q is not detected (NO in step S113), the control unit 120 determines whether the guide information is received from the guide server 190 (step S121). When it is determined that the guide information is not received (NO in step S121), the control unit 120 returns the process to step S101. Meanwhile, when it is determined that the guide information is received from the guide server 190 (YES in step S121), the control unit 120 displays the guide information on the reproducing unit 160a. When the received guide information is plural, the control unit 120 displays a plurality of guide information as a list of titles on the reproducing unit 160 (step S122). Then, when a title of any guide information is selected by the designating unit 160b, the control unit 120 displays the selected guide information on the reproducing unit 160 in detail (step S123).

As described above, the imaging apparatus 100 according to the embodiment of the present invention has the two imaging units of the imaging unit to record the high-definition image data and the imaging unit to acquire the guide information. The same subject is imaged by these imaging units, so that a plurality of image data optimized according to an object can be acquired.

In addition, the guide information is preferably searched using the second image data β having the same viewing angle as that of the first image data α. For this reason, in the embodiment of the present invention, the region in the second image data β corresponding to the first image data α is transmitted to the guide server 190. Thereby, higher-definition guide information can be acquired by matching the viewing angles of the first image data and the second image data to each other.

Next, an imaging apparatus 100 according to a first modification of the embodiment of the present invention will be described. Because a configuration and a use example of the first modification are the same as those of the embodiment described above, explanation thereof is omitted. The imaging apparatus 100 according to the embodiment searches the region in the second image data β corresponding to the entire region of the first image data α. Meanwhile, the imaging apparatus 100 according to the first modification searches a region in the second image data β corresponding to a predetermined region in the first image data α.

An operation example of the imaging apparatus 100 according to the first modification will be described. Explanation of the same process as that of the first embodiment is omitted.

In step S115, a control unit 120 reads the first image data α at the time of acquiring the second image data β from a storage unit 140 and reproduces the first image data α on a reproducing unit 160a. When a predetermined region in the first image data α at the time of the acquisition is selected by a designating unit 160b, the control unit 120 transmits information of a region of the second image data β corresponding to the selected predetermined region to a guide server 190. The region of the second image data β can be selected by a method illustrated in FIGS. 4, 5A, and 5B, by detecting a deviation amount of a center position of the selected predetermined region and a center position of the first image data α and a size of the selected predetermined region.

The imaging apparatus 100 according to the first modification of the first embodiment of the present invention can select a smaller region from the region corresponding to the first image data α in the second image data β. A user can acquire guide information for a more limited region in the first image data α. Information of a smaller limited region is transmitted to the guide server 190, so that a communication data capacity further decreases. Thereby, an increase of a communication speed of new communication is expected. In addition, the imaging apparatus 100 may further resize the transmitted region of the second image data β, decrease a data amount, and increase the communication speed.

Next, an imaging apparatus 200 according to a second modification of the embodiment of the present invention will be described. The imaging apparatus 200 has a photo image imaging unit 210 (external camera) illustrated in FIG. 7A and an imaging unit 220 for an environment analysis illustrated in FIG. 7B. The photo image imaging unit 210 is configured to be attached to or detached from the imaging unit 220 for the environment analysis through an attachment 230, as illustrated in FIG. 7C. When the photo image imaging unit 210 is attached, the photo image imaging unit 210 is attached such that an optical axis of the imaging unit 220 for the environment analysis and an optical axis of the photo image imaging unit 210 are parallel to each other (do not exist on skew lines). The imaging unit 220 for the environment analysis is a smart phone, for example.

The photo image imaging unit 210 is an imaging unit that can perform communication with the imaging unit 220 for the environment analysis by a wireless LAN, for example. The photo image imaging unit 210 has a first imaging unit 110 and acquires first image data α. The photo image imaging unit 210 has a control ring to perform a zoom operation, for example. Meanwhile, the imaging unit 220 for the environment analysis has a second imaging unit 130, acquires second image data β, transmits the second image data β to a guide server 190, and acquires guide information for the first image data α. A user may use the photo image imaging unit 210 as a single body.

Figure 8:
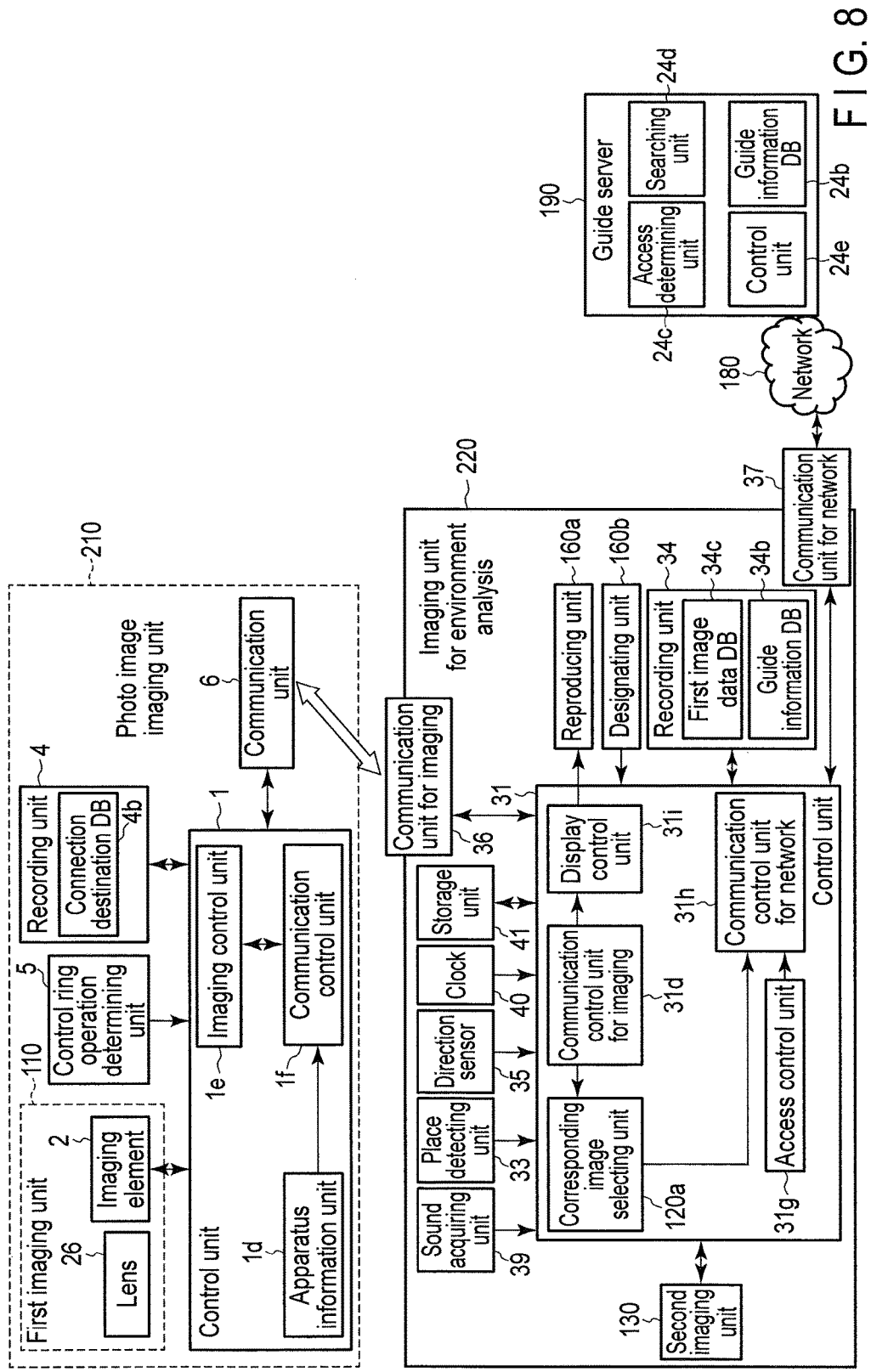
FIG. 8 is a diagram illustrating a configuration example of an imaging apparatus according to a second modification.

FIG. 8 is a diagram illustrating a detailed configuration example of the imaging apparatus 200 illustrated in FIGS. 7A, 7B, and 7C. In FIG. 8, configurations corresponding to those in FIG. 2 are denoted with the same reference numerals as those in FIG. 2.

The photo image imaging unit 210 has the first imaging unit 110, a control unit 1, a control ring operation determining unit 5, a recording unit 4, and a communication unit 6.

The first imaging unit 110 has a lens 26 and an imaging element 2. The lens 26 makes light from a subject incident on the imaging element 2. The imaging element 2 generates the first image data α from the light received by the lens 26.

The control unit 1 is configured by an integrated circuit, for example, and has an imaging control unit 1e, an apparatus information unit 1d, and a communication control unit 1f. The imaging control unit 1e controls driving of the lens 26 based on predetermined control data or programs recorded in a recording unit 34 and controls focusing. The apparatus information unit 1d stores model information of the first imaging unit 110, for example, a viewing angle and an aspect ratio. The communication control unit 1f controls the communication unit 6 and performs control for communication of the photo image imaging unit 210 and the imaging unit 220 for the environment analysis.

The control ring operation determining unit 5 determines an operation of a control ring 5a to be a ring operation member rotatable for a zoom operation of the lens 26, for example. In addition, the control ring operation determining unit 5 may be configured to determine an operation of an operation switch. The recording unit 4 records the first image data α acquired by the first imaging unit 110 and a program necessary for an operation of the photo image imaging unit 210. In addition, the recording unit 4 has a connection destination database (DB) 4b. The connection destination DB 4b records authentication information for wireless connection with the imaging unit 220 for the environment analysis.

Meanwhile, the imaging unit 220 for the environment analysis has a second imaging unit 130, a control unit 31, a recording unit 34, a storage unit 41, a communication unit 36 for imaging, a communication unit 37 for a network, a place detecting unit 33, a direction sensor 35, a sound acquiring unit 39, a clock 40, a reproducing unit 160a, and a designating unit 160b.

The control unit 31 operates based on a program stored in the recording unit 34 and has a corresponding image selecting unit 120a, a display control unit 31i, a communication control unit 31d for imaging, a communication control unit 31h for a network, and an access control unit 31g.

The corresponding image selecting unit 120a reads information of a viewing angle or an aspect ratio of the first imaging unit 110 acquired by the communication and selects image data of a region corresponding to a region of the first image data α from a region in the second image data β acquired by the second imaging unit 130. The display control unit 31i executes a process for reproducing the first image data α acquired by the communication control unit 31d for the imaging and guide information recorded in a guide information database (DB) 34b by the reproducing unit 160a. The communication control unit 31d for the imaging controls the communication unit 36 for the imaging and performs control for communication of the imaging unit 220 for the environment analysis and the photo image imaging unit 210. The communication control unit 31h for the network controls the communication unit 37 for the network and performs control for communication of the imaging unit 220 for the environment analysis and the guide server 190. The access control unit 31g performs authentication at the time of having access to the imaging unit 220 for the environment analysis and the guide server 190.

The recording unit 34 has a guide information DB 34b and a first image data DB 34c. The guide information DB 34b is a database to store the guide information received from the guide server 190. The first image data DB 34c records the first image data α acquired by the photo image imaging unit 210. The storage unit 41 temporarily stores a live-view image (first image data α) acquired by the photo image imaging unit 210.

The place detecting unit 33 is a GPS, for example, and detects a current position of the imaging unit 220 for the environment analysis. The direction sensor 35 is an electronic compass, for example, and detects a current direction of the imaging unit 220 for the environment analysis. The sound acquiring unit 39 is a microphone and converts a sound input from the outside into an electric signal. The clock 40 measures time.

The guide server 190 has a guide information DB 24b, an access determining unit 24c, a searching unit 24d, and a control unit 24e. The access determining unit 24c authenticates accesses of the imaging unit 220 for the environment analysis and the guide server 190. The searching unit 24d searches guide information from the guide information database (DB) 24b, using the image data of the region corresponding to the region of the first image data α of the region in the second image data β, as a search key. The control unit 24e controls searching and transmission of the guide information.

The photo image imaging unit 210 operates in cooperation with the imaging unit 220 for the environment analysis. An operation example of the photo image imaging unit 210 will be described using FIG. 9. In addition, an operation example of the photo image imaging unit 210 operating cooperatively will be descried using FIGS. 10A and 10B.

First, the control unit 1 determines whether a power supply of the photo image imaging unit 210 is turned on (step S201). When it is determined that the power supply of the photo image imaging unit 210 is not turned on (NO in step S201), the control unit 1 turns off the power supply. Meanwhile, when it is determined that a power supply of the imaging unit 220 for the environment analysis is turned on (YES in step S201), the control unit 1 determines whether an imaging mode is selected (step S202). When the imaging mode is not selected (NO in step S202), the control unit 1 determines whether a reproduction mode is selected (step S231). When it is determined that the reproduction mode is not selected (NO in step S231), the control unit 1 returns the process to step S201. Meanwhile, when it is determined that the reproduction mode is designated (YES in step S231), the control unit 1 transmits the first image data α recorded in the recording unit 4 to the imaging unit 220 for the environment analysis through the communication unit 6, to reproduce the image data by the reproducing unit 160a (step S232).

Meanwhile, when it is determined that the imaging mode is selected (YES in step S202), the control unit 1 starts imaging, acquires the first image data α as image data for the live-view image, and transmits the first image data α to the imaging unit 220 for the environment analysis through the communication unit 6 (step S203). Then, the control unit 1 determines whether the control ring 5a is operated, by the control ring operation determining unit 5 (step S204). The operation is an operation to change an imaging parameter of the side of the photo image imaging unit (external camera) 210, for example. The imaging parameter is a shutter speed, for example. The change of the imaging parameter of the photo image imaging unit 210 is exemplified. However, exposure correction in the imaging unit 220 for the environment analysis may be changed by the operation of the control ring 5a. When it is determined that the control ring operation determining unit 5 is operated (YES in step S204), the control unit 1 changes the imaging parameter according to the operation of the control ring 5a of the photo image imaging unit 210 (step S205). Meanwhile, when it is determined that the control ring 5a is not operated (NO in step S204), the control unit 1 makes the process proceed to step S211. In addition, the control unit 1 determines whether the imaging unit 220 for the environment analysis requests for the guide information (step S211). When it is determined that the imaging unit 220 for the environment analysis requests for the guide information (YES in step S211), the control unit 1 acquires information necessary for acquiring the guide information by the imaging unit 220 for the environment analysis, in this case, information of a viewing angle or an aspect ratio of the photo image imaging unit 210 from the apparatus information unit 1d and transmits the information to the imaging unit 220 for the environment analysis (step S212). Then, the control unit 1 determines whether an operation signal is received from the imaging unit 220 for the environment analysis (step S213). The operation signal is a signal to control the imaging parameters of the photo image imaging unit 210, for example, focusing, an exposure value, an aperture value, and sensitivity by the operation in the imaging unit 220 for the environment analysis. When it is determined that the operation signal is received from the imaging unit 220 for the environment analysis (YES in step S213), the control unit 1 performs control according to the operation signal from the imaging unit 220 for the environment analysis (step S214). After step S214 or when it is determined that the operation signal is not received from the imaging unit 220 for the environment analysis (No in step S213), it is determined whether the signal for the imaging operation is received from the imaging unit 220 for the environment analysis (step S221). When it is determined that the signal for the imaging operation is received from the imaging unit 220 for the environment analysis (YES in step S221), the control unit 1 acquires the first image data α by imaging for image recording (step S222). After step S222, the control unit 1 records the first image data α acquired by the imaging in the recording unit 4 (step S223).

Figure 9:
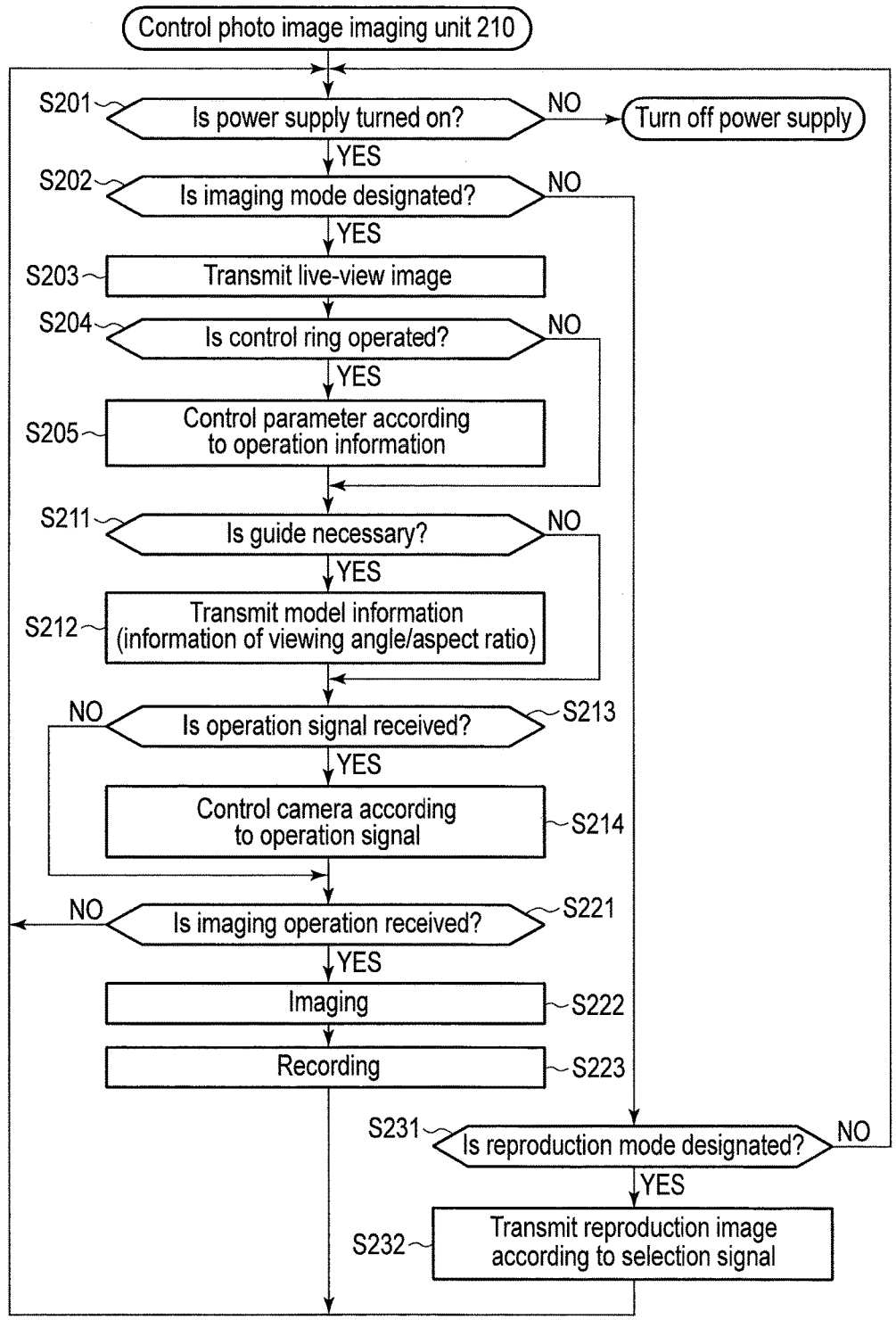
FIG. 9 is a diagram illustrating an operation example of the photo image imaging unit.
Figure 10B:
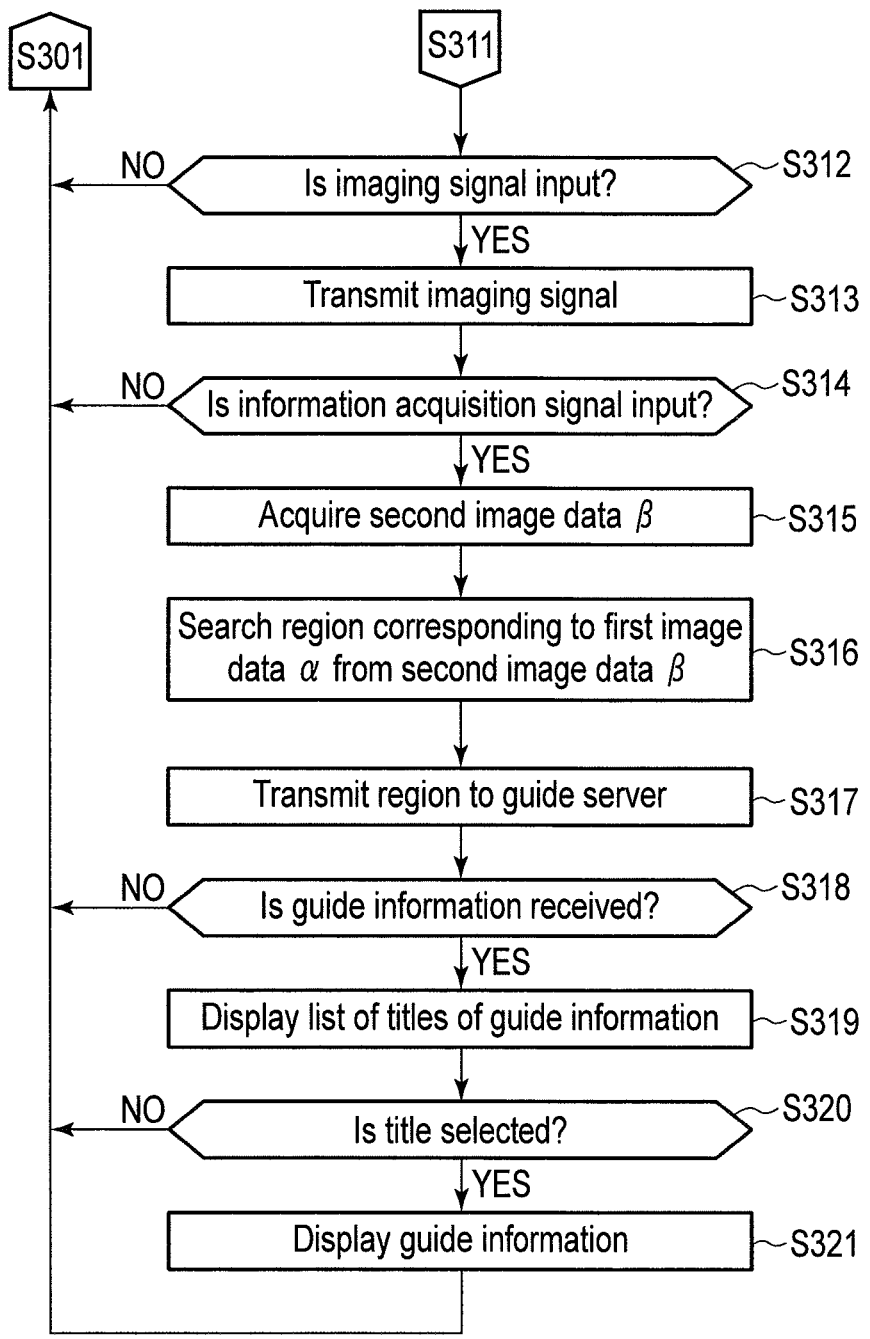
FIG. 10B is a second diagram illustrating the operation example of the imaging unit for the environment analysis.

Meanwhile, the imaging unit 220 for the environment analysis starts control in parallel with the operation of the photo image imaging unit 210 illustrated in FIG. 9, as illustrated in FIGS. 10A and 10B. The control unit 31 determines whether communication with the photo image imaging unit 210 is performed (step S301). When it is determined that the communication with the photo image imaging unit 210 is not performed (NO in step S301), the control unit 31 selects other mode. Other mode is a reproduction mode, for example. In the reproduction mode, the first image data α recorded in the first image data DB 34c is reproduced. Meanwhile, when it is determined that the communication with the photo image imaging unit 210 is performed (YES in step S301), the control unit 31 detects an attachment position of the attachment 230 for the imaging unit 220 for the environment analysis. That is, the control unit 31 detects an interval of an optical axis of the imaging unit 220 for the environment analysis and an optical axis of the photo image imaging unit 210 for each of a horizontal direction x and a vertical direction y. Then, the control unit 31 determines whether the live-view image (first image data) is received from the photo image imaging unit 210 through the communication unit 36 for the imaging (step S303). When it is determined that the live-view image is not received (NO in step S303), the control unit 31 returns the process to step S301. Meanwhile, when it is determined that the live-view image is received (YES in step S303), the control unit 31 determines whether the guide information corresponding to the received live-view image is recorded in the guide information DB 34b (step S304). When it is determined that the guide information is recorded in the guide information DB 34b (YES in step S304), the control unit 31 reproduces the live-view image by the reproducing unit 160a and displays the guide information (step S305). The control unit 31 may display the parameters on the reproducing unit 160a at the same time as the guide information. Meanwhile, when it is determined that the guide information is not recorded in the guide information DB 34b (NO in step S304), the control unit 31 reproduces the live-view image by the reproducing unit 160a (step S306). After steps S305 and S306, the control unit 31 displays an imaging switch P, an information acquisition switch Q, and an operation switch R on the reproducing unit 160a (step S307). Then, the control unit 31 determines whether an operation signal is input from the operation switch R (step S308). When it is determined that the operation signal is input from the operation switch R (YES in step S308), the control unit 31 transmits the operation signal corresponding to the operation switch R to the photo image imaging unit 210 through the communication unit 36 for the imaging (step S309). Then, the control unit 31 determines whether the operation signal corresponding to the operation of the control ring operation determining unit 5 of the photo image imaging unit 210 is received from the photo image imaging unit 210 through the communication unit 36 for the imaging (step S310). The operation signal is a zoom operation, for example. When it is determined that the operation signal corresponding to the operation of the control ring operation determining unit 5 is received from the photo image imaging unit 210 through the communication unit 36 for the imaging (YES in step S310), the control unit 31 performs control based on the received operation signal (step S311). Then, the control unit 31 determines whether the operation signal is input from the imaging switch P (step S312). When it is determined that the operation signal is input from the imaging switch P (YES in step S312), the control unit 31 transmits the signal for the imaging operation to the photo image imaging unit 210 through the communication unit 36 for the imaging (step S313). The signal for the imaging operation is transmitted, so that the first image data α is acquired in the photo image imaging unit 210. Then, the control unit 31 determines whether an information acquisition signal showing that the information acquisition switch Q has been operated is input (step S314). When it is determined that the information acquisition signal is input (YES in step S314), the control unit 31 acquires the second image data β, (step S315). In addition, the control unit 31 acquires the information of the viewing angle or the aspect ratio of the first imaging unit from the photo image imaging unit 210 through the communication unit 36 for the imaging, reads the live-view image (first image data α) at the time of acquiring the second image data β, from the storage unit 41, and selects the region corresponding to the region of the first image data α from the region in the second image data β, (step S316). Then, the control unit 31 transmits the corresponding region or color information or distance information obtained by analyzing the corresponding region to the guide server 190 through the communication unit 37 for the network (step S317). As such, the second image data β, has a characteristic different from a characteristic of the first image data α for recording and viewing, to acquire the guide information. The first image data α has information necessary for an expression of emotional beauty such as detail, gradation, and color tone, to be used for viewing the imaged image data. Meanwhile, in the second image data β, contrast or color information is preferably clear with handling easy information. In addition, auxiliary information such as distance information or size information may be preferably added to the second image data β. The imaging apparatus 100 according to this embodiment can simply acquire the second image data β, to acquire the guide information described above. The distance information may be acquired from imaging results by the two imaging units using triangulation or a distance measurement sensor may be embedded in an imaging element to be a light reception surface of each imaging unit and a result of the distance measurement sensor may be used. A size of a target material is determined by the distance with the subject and the viewing angle information. In the second modification, the second imaging unit 130 embedded in the imaging unit 220 for the environment analysis (smart phone) is used without attaching a new imaging unit to the attachment 230, to acquire the second image data β. The embedded second imaging unit 130 is superior to an imaging unit newly attached externally, in terms of simplicity (a negotiation is unnecessary) or easiness of connection at the time of communication, such as omission of wireless communication for the imaging. The second imaging unit 130 of the imaging unit 220 (smart phone) for the environment analysis can be used as a single body, for recording. The user can determine whether the imaging unit 220 for the environment analysis is used as the single body or is used in cooperation with the photo image imaging unit 210, from an image quality of the live-view image reproduced by the reproducing unit 160a of the imaging unit 220 for the environment analysis. When the photo mage imaging unit (external camera) 210 performs zoom or a lens of the photo image imaging unit 210 is exchanged, the imaging unit 220 for the environment analysis may perform control to widen a viewing angle to a wide angle side, such that the viewing angle of the second imaging unit 130 embedded in the imaging unit 220 for the environment analysis includes the viewing angle of the photo image imaging unit 210. A zoom operation of the imaging unit 220 for the environment analysis may be performed in cooperation with a zoom operation of the photo image imaging unit 210 (external camera). Then, the control unit 31 determines whether the guide information is received from the guide server 190 (step S318). When it is determined that the guide information is not received (NO in step S318), the control unit 31 returns the process to step S301. Meanwhile, when it is determined that the guide information is received (YES in step S318), in the case in which the received guide information is plural, the control unit 31 displays titles of the plurality of guide information on the reproducing unit 160a in a form of a list (step S319). In addition, it is determined whether the titles of the guide information displayed in a form of the list are selected (step S320). When it is determined that the titles are selected (YES in step S320), the control unit 31 displays the selected guide information in detail (step S321). When it is determined that the titles are not selected (NO in step S320), the control unit 320 returns the process to step S301. In the imaging apparatus 200 according to the second modification of the present invention, the photo image imaging unit 210 and the imaging unit 220 for the environment analysis are connected to be separable from each other. The user acquires the first image data α by the photo image imaging unit 210 and can view the first image data α from the reproducing unit 160a of the imaging unit 220 for the environment analysis. In addition, the user can view the guide information of the first image data α from the reproducing unit 160a by the second image data β acquired by the imaging unit 220 for the environment analysis. In addition, the user can operate each imaging unit as a single body. An operation of parameters of the imaging unit 220 for the environment analysis is preferably linked, when imaging parameters of the photo image imaging unit 210, for example, a zoom operation, exposure correction, a focusing position, and other image process are operated by the user, like the cooperation of the zoom operation described above. For example, when the user aims at a red flower with the photo image imaging unit 210 and performs an operation of exposure control to reproduce a color of the flower, the exposure control is not performed in the imaging unit 220 for the environment analysis. For this reason, a red color may not be determined. In this case, the imaging apparatus 100 may determine a touch operation of the user and narrow a portion in which the user desires to make control of the photo image imaging unit 210 and exposure control of the imaging unit 220 for the environment analysis cooperate with each other. In addition, for the imaging apparatus according to each embodiment of the present invention, explanation of an imaging use is made mainly. However, it is needless to say that each embodiment of the present invention can be used when a target material is observed with a high image quality while the guide information is obtained. For example, it is needless to say that the present invention can be applied to an apparatus such as a telescope to view a distant object or a system thereof and an apparatus such as a microscope to view a close object or a system thereof. In addition, the present invention can be applied to a monitoring camera, an inspection device, or a medical instrument or a system thereof. In addition, it is needless to say that an imaging unit for an observation and an imaging unit for information acquisition are separately provided for an apparatus for the observation or a system thereof.

In addition, each process by the imaging apparatus in the embodiment described above may be stored as a program that can execute any process. As for the program, a program stored in a storage medium of an external storage device such as a memory card (a ROM card, a RAM card, and the like), a magnetic disk (a floppy (registered trademark) disk, a hard disk, and the like), an optical disk (a CD-ROM, a DVD, and the like), and a semiconductor memory is read and an operation is controlled by the read program, so that the process described above can be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    a communication circuit that receives first image data transmitted from another imaging apparatus;
    an imaging circuit that acquires second image data including a region corresponding to a region of the first image data;
    a control circuit that selects a first region corresponding to an entire region of the first image data from the second image data, or selects a second region corresponding to a region of a part of the first image data in response to a touch operation, the control circuit causing the communication circuit to transmit, to a server, the first region, the second region, or information obtained by analyzing the first region or the second region, and to receive guide information from the server; and
    a reproducing circuit that associates the first image data with the guide information to reproduce the first image data and the guide information.

2. The imaging apparatus according to claim 1, wherein the control circuit causes the imaging circuit to acquire the second image data when the guide information corresponding to the received first image data is not present.

3. The imaging apparatus according to claim 1, wherein the control circuit causes the imaging circuit to acquire the second image data when the guide information corresponding to the received first image data is not present and an information acquisition signal is input by an operation by a user.

4. The imaging apparatus according to claim 3, wherein the operation by the user is a touch operation on an information acquisition switch.

5. The imaging apparatus according to claim 1, wherein the imaging apparatus is a smartphone.

6. The imaging apparatus according to claim 1, wherein the guide information includes a method of imaging the first image data.

7. The imaging apparatus according to claim 1, wherein the guide information includes map information to specify a position of a subject in the first image data.

8. The imaging apparatus according to claim 1, wherein the control circuit transmits, to the server, at least one of sound information, direction information, position information, and time information, in addition to the first region, the second region, or the information obtained by analyzing the first region or the second region.

9. An imaging method comprising:
    receiving first image data transmitted from another imaging apparatus;
    acquiring second image data including a region corresponding to a region of the first image data;

selecting a first region corresponding to an entire region of the first image data from the second image data, or selecting a second region corresponding to a region of a part of the first image data in response to a touch operation;

transmitting, to a server, the first region, the second region, or information obtained by analyzing the first region or the second region, and receiving guide information from the server; and associating the first image data with the guide information to reproduce the first image data and the guide information.

10. An imaging apparatus comprising:

an imaging circuit that acquires first image data;

a communication circuit that transmits the first image data to another imaging apparatus; and a control circuit that controls the imaging circuit in such a manner that an entire region of the first image data corresponds to a first region of second image data acquired in said another imaging apparatus, or a region of a part of the first image data corresponds to a second region of the second image data acquired in said another imaging apparatus.

11. An imaging method comprising:

acquiring, by an imaging circuit, first image data;

transmitting the first image data to another imaging apparatus; and controlling the imaging circuit in such a manner that an entire region of the first image data corresponds to a first region of second image data acquired in said another imaging apparatus, or a region of a part of the first image data corresponds to a second region of the second image data acquired in said another imaging apparatus.

\* \* \* \* \*